United States Patent
Iwayama

(10) Patent No.: US 7,466,431 B2
(45) Date of Patent: Dec. 16, 2008

(54) METHOD AND APPARATUS OF MEASURING A LENGTH OF A BAND-SHAPED MEMBER

(75) Inventor: Shinya Iwayama, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 130 days.

(21) Appl. No.: 11/660,605

(22) PCT Filed: Aug. 15, 2005

(86) PCT No.: PCT/JP2005/014904

§ 371 (c)(1),
(2), (4) Date: Feb. 20, 2007

(87) PCT Pub. No.: WO2006/019070

PCT Pub. Date: Feb. 23, 2006

(65) Prior Publication Data

US 2008/0123113 A1 May 29, 2008

(30) Foreign Application Priority Data

Aug. 20, 2004 (JP) ............................. 2004-240284

(51) Int. Cl.
*G01B 11/06* (2006.01)
(52) U.S. Cl. ..................................... 356/634; 356/614
(58) Field of Classification Search ......... 356/625–640, 356/614–623; 250/559.26, 559.29
See application file for complete search history.

(56) References Cited

U.S. PATENT DOCUMENTS 6,862,098 B1 * 3/2005 Tanuma et al. .............. 356/623

2002/0154318 A1 * 10/2002 Matsunaga et al. .......... 356/623

FOREIGN PATENT DOCUMENTS

| JP | 4-198804 A | 7/1992 |
|----|------------|--------|
| JP | 5-345125 A | 12/1993 |
| JP | 6-323817 A | 11/1994 |
| JP | 2003-028630 A | 1/2003 |

* cited by examiner

*Primary Examiner*—Hoa Q Pham
(74) *Attorney, Agent, or Firm*—Sughrue Mion, PLLC

(57) ABSTRACT

In order to measure the length F of the band-shaped member 15 in all the positions in a specified width-direction region with a simple construction, a two-dimensional laser displacement sensors 18, 19 emitting laser beams 22, 23 inclined at a certain angle with respect to a longitudinal direction of the band shaped member 15 and the band-shaped member 15 move relative to each other in the longitudinal direction of the band-shaped member 15, each position of a starting end 15a and a terminating end 15b of the band-shaped member 15 crossing the laser beam 22, 23 is detected repeatedly by the two-dimensional laser displacement sensors 18, 19 each time a relative moving distance between the two-dimensional laser displacement sensors 18, 19 and the band-shaped member 15 reaches a certain value, a position information of the starting end 15a and the terminating end 15b of the band-shaped member 15 at each width-direction position is obtained from a detection result thereof, and the length of the band-shaped member 15 at each width-direction position is obtained based on the position information of the starting end 15a and the terminating end 15b at each width-direction position. Thereby, it is possible to obtain the length of the band-shaped member 15 at any width-direction position in the width-direction region crossing the laser beam 22, 23.

6 Claims, 4 Drawing Sheets

METHOD AND APPARATUS OF MEASURING A LENGTH OF A BAND-SHAPED MEMBER

TECHNICAL FIELD

The present invention relates to a method and an apparatus of measuring a length of a band-shaped member with a two-dimensional laser displacement sensor.

RELATED ART

As a conventional method and apparatus of measuring a length of a band-shaped member, those as described in Japanese Patent Application Laid-Open No. 2003-28630 is known, for example.

According to Japanese Patent Application Laid-Open No. 2003-28630, a continuous band-shaped rubber member is cut into band-shaped rubber members of a constant length as it is carried by a conveyor while a gap provided between the continuous band-shaped rubber member and the band-shaped rubber member of the constant length is repeatedly detected by one laser sensor provided above the conveyor. The length of the band-shaped rubber member of a constant length is measured by calculating a distance between the gaps with control means based on these detection results.

DISCLOSURE OF THE INVENTION

Problem to be Solved by the Invention

However, according to such conventional method and apparatus of measuring the length of the band-shaped member, the gap is detected by applying one ray of light from the laser sensor to the band-shaped member, so that the length of the band-shaped rubber member of a constant length can be measured at only one specified width-direction position (one point). As a result, there is a problem that it is impossible to detect a change in the length of the band-shaped rubber member of a constant length when the band-shaped rubber member of a constant length contracts partially after cutting from the band-shaped rubber member or deforms partially while moving between conveyors.

The object of the invention is to provide a method and an apparatus of measuring a length of a band-shaped member which can measure the length of the band-shaped member in all the positions in a specified width-direction region with a simple construction.

Means for Solving Problem

The object is achieved by a method of measuring a length of a band-shaped member comprising steps of: moving a two-dimensional laser displacement sensor emitting laser beams inclined at a certain angle with respect to a longitudinal direction of the band shaped member and the band-shaped member relative to each other in the longitudinal direction of the band-shaped member, detecting repeatedly each position of a starting end and a terminating end of the band-shaped member crossing the laser beams by the two-dimensional laser displacement sensor each time a relative moving distance between the two-dimensional laser displacement sensor and the band-shaped member reaches a certain value, and obtaining a position information of the starting end and the terminating end of the band-shaped member at each width-direction position from a detection result thereof; and obtaining the length of the band-shaped member at each width-direction position based on the position information of the starting end and the terminating end at each width-direction position.

Moreover, the object is achieved by an apparatus of measuring a length of a band-shaped member comprising a two-dimensional laser displacement sensor emitting laser beams inclined at a certain angle with respect to a longitudinal direction of the band shaped member; relative moving means for moving the two-dimensional laser displacement sensor and the band-shaped member relative to each other in the longitudinal direction of the band-shaped member; and control means for obtaining a position information of a starting end and a terminating end of the band-shaped member crossing the laser beams from a detection result detected repeatedly each position of the starting end and the terminating end of the band-shaped member when the detection result is input from the two-dimensional laser displacement sensor each time a relative moving distance obtained from said relative moving means reaches a certain value and obtaining the length of the band-shaped member at each width-direction position based on the position information of the starting end and the terminating end at each width-direction position.

EFFECT OF THE INVENTION

According to the invention, a two-dimensional laser displacement sensor emitting laser beams inclined at a certain angle with respect to a longitudinal direction of the band shaped member and the band-shaped member move relative to each other in the longitudinal direction of the band-shaped member, each position of a starting end and a terminating end of the band-shaped member crossing the laser beams is detected repeatedly by the two-dimensional laser displacement sensor each time a relative moving distance between the two-dimensional laser displacement sensor and the band-shaped member reaches a certain value, a position information of the starting end and the terminating end of the band-shaped member at each width-direction position is obtained from a detection result thereof, and the length of the band-shaped member at each width-direction position is obtained based on the position information of the starting end and the terminating end at each width-direction position. Thereby, it is possible to obtain the length of the band-shaped member at any width-direction position in the width-direction region crossing the laser beam. Moreover, this effect is achieved by a simple construction where the two-dimensional laser displacement sensor is provided instead of the conventional laser sensor for measuring a length.

Furthermore, according to one aspect it is possible to obtain a lapping amount at each width-direction position of a junction, formed by applying the band-shaped member on a circumference of a building drum easily and reliably with a simple construction. Furthermore, according to another aspect a timing when detecting the starting end and the terminating end of the band-shaped member by the two-dimensional laser displacement sensor (each time the moving distance reaches a constant value) can be highly accurate with a simple construction.

Furthermore, by according to yet another aspect it is possible to prevent an error caused by an arc deformation of the band-shaped member from occurring. Furthermore, according to still another aspect it is possible to obtain the position information between the detection results easily and reliably.

BEST MODE FOR CARRYING OUT THE INVENTION

The detailed description of the invention is described with reference to accompanying drawings.

Figure 1:
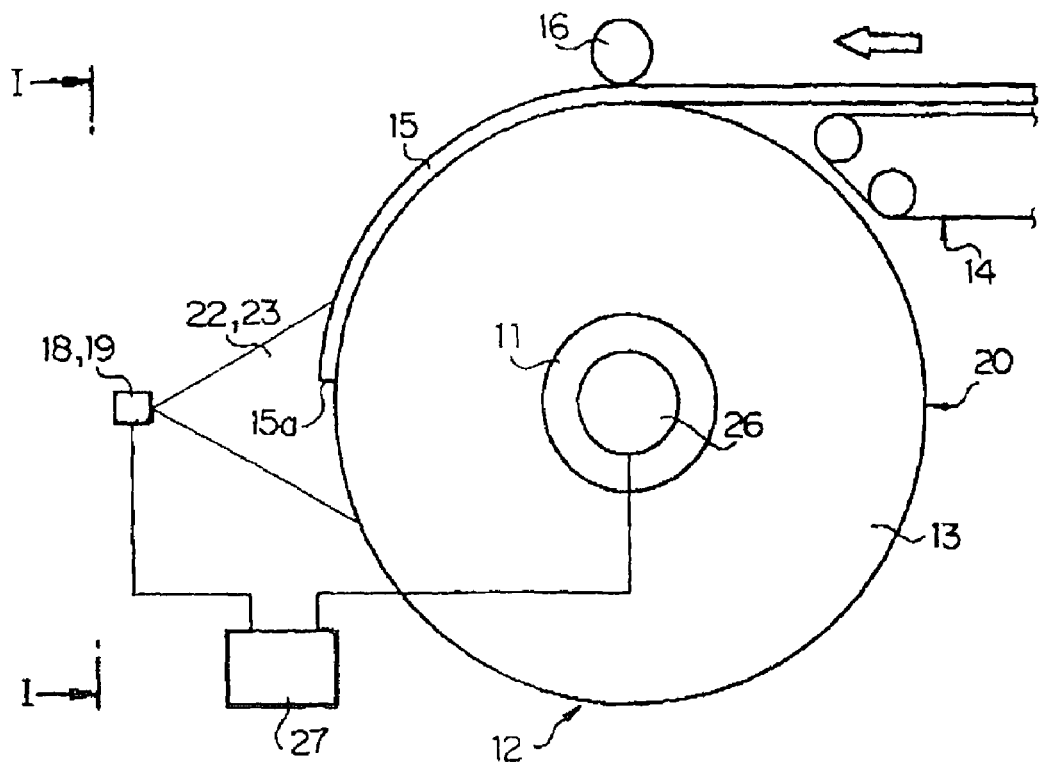
FIG. 1 is a schematic side view when detecting a starting end of a band-shaped member showing a first embodiment of the present invention.
Figure 2:
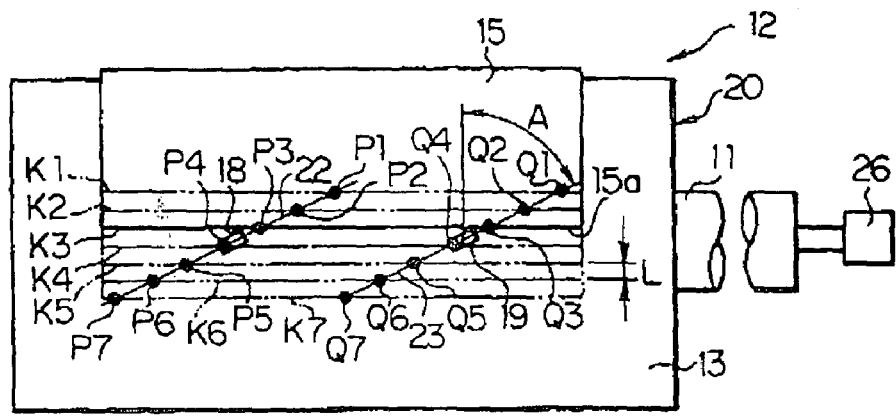
FIG. 2 is a view on arrow of I-I shown in FIG. 1.

FIGS. 1 to 5 show a first embodiment of the present invention. In FIGS. 1 and 2, numeral number 11 indicates a horizontal main axis of a tire building machine 12. The main axis 11 is rotationally driven at a constant speed by a drive motor (not shown in the figure) as required. Numeral number 13 indicates a cylinder-shaped building drum which is connected to an end part of the main axis 11 and can expand and shrink in the diametrical direction. Behind the building drum 13, a horizontal conveyor 14 extending in back and forth direction is provided. Numeral number 15 indicates a band-shaped member of a constant length. The band-shaped member 15 is placed on the conveyor 14 and consists of a tire component member such as a carcass ply or the like extending parallel along the conveyor 14. The band-shaped member 15 is conveyed toward the building drum 13 (i.e. forward) as the conveyor 14 runs.

The band-shaped member 15 is conveyed to the top of the building drum 13 by the conveyor 14 running at the same speed as the circumferential speed of the building drum 13 when the building drum 13 as well as the main axis 11 is rotated by the drive motor, for example, in counterclockwise direction in FIG. 1. The band-shaped member 15 is pressed onto the building drum 13 by a pressing roller 16 and applied on the circumference of the building drum 13 in sequence. In this manner, the band-shaped member 15 is applied on the circumference of the building drum 13, so that the band-shaped member 15 moves in the longitudinal direction thereof with it being bent into arc shape as the building drum 13 rotates.

Numeral numbers 18 and 19 indicate a plurality of two-dimensional laser displacement sensors, two sensors herein (e.g. sunx's BL-DI), which are provided in front of the building drum 13 within the horizontal surface including the rotation axis of the building drum 13. These two-dimensional laser displacement sensors 18, 19 are disposed at the same distance forward from the building drum 13 as well as they are disposed at a constant distance in the direction of the rotation axis of the building drum 13. As a result, the band-shaped member 15 moves in the longitudinal direction thereof with respect to the two-dimensional laser displacement sensors 18, 19 as the building drum 13 on which the band-shaped member 15 is applied. The main axis 11 and the building drum 13 form a relative displacing means 20 as a whole in which the two-dimensional laser displacement sensors 18, 19 and the band-shaped member 15 move relative to each other in the longitudinal direction of the band-shaped member 15.

The two-dimensional laser displacement sensors 18, 19 as described above emit curtain-like (plane-like) laser beam, which extends not like a straight line but like a sector, so that the laser beams 22, 23 form lighting lines on a surface of a target (or a curved line, which is substantially arc, on the arc-like surface such as the surface of the band-shaped member 15 applied on the circumference of the building drum 13).

If the stepped part, in this embodiment, the starting end 15a or the terminating end 15b, is at a position crossing laser beams 22, 23, in particular the above-mention lighting line, the two-dimensional laser displacement sensors 18, 19 detect the positions of the starting end 15a and the terminating end 15b (the position coordinate on the lighting line) based on a reflected light from these starting end 15a and terminating end 15b. In this manner, the two-dimensional laser displacement sensors 18, 19 can detect the position of the stepped part when the stepped part comes in the region of the laser beams 22, 23 (the region of the above-mentioned lighting line).

In addition, each two-dimensional laser displacement sensor 18, 19 is arranged such that each laser beam 22, 23 is inclined for a specified angle A with respect to the longitudinal direction of the band-shaped member 15 applied to the building drum 13 (the circumference direction of the building drum 13). As a result, each two-dimensional laser displacement sensor can detect the position of the above-mentioned stepped part (starting end 15a and terminating end 15b) in a wide range in the width direction of the band-shaped member 15.

In this embodiment, each two-dimensional laser displacement sensor 18, 19 is arranged such that the lighting line from the laser beam 22 of the two-dimensional laser displacement sensor 18 on one side covers a half of the band-shaped member 15 and the lighting line from the laser beam 23 of the two-dimensional laser displacement sensor 19 on the other side covers the other half of the band-shaped member 15. As a result, the band-shaped member 15 can cross the lighting line in all range of the width direction, so that the starting end 15a and the terminating end 15b can be detected at all the points in the width direction.

Numeral number 26 indicates an encoder, which is connected to the building drum 13 through the main axis 11. The encoder 26 detects the rotation of the building drum 13 while outputting a pulse signal as a synchronous signal to a control means 27 each time the moving distance of the circumference of the building drum 13 reaches a specified value when the building drum 13 rotates at a specified angle. The control means 27 samples the detection result of the two-dimensional laser displacement sensors 18, 19 each time the pulse signal is input from the encoder 26, in particular when the pulse signal input rises, stores the detection results and obtains the position information of the starting end 15a and the terminating end 15b at each width-direction position based on this stored detection results.

In this manner, the encoder 26 is arranged on the building drum 13 such that the position of the starting end 15a and the terminating end 15b respectively of the band-shaped member is detected repeatedly each time the relative moving distance between the two-dimensional laser displacement sensors 18, 19 and the band-shaped member 15 reaches a specified value by sampling the detection result of the two-dimensional laser displacement sensors 18, 19 each time the pulse signal is input from the encoder 26. As a result, it is possible to make a timing highly accurate with a simple construction to detect the starting end 15a and the terminating end 15b of the band-shaped member 15 by the two-dimensional laser displacement sensors 18, 19 (each time the displacing distance reaches a constant value).

The above-mentioned position information of the starting end 15a at each width-direction position is obtained as following. As shown in FIG. 2, when the starting end 15a of the band-shaped member applied on the building drum 13 reaches to the rotation point K1 by the rotation of the building drum 13 just after the application on building drum 13, the pulse signal from the encoder 26 is input to the control means 27, and thereby the control means 27 samples the detection result from the 2-dimension laser displacement sensors 18, 19, and stores this detection result.

In particular, at this time, the starting end 15a crosses the other side end of the laser beams 22, 23 so that the two-dimensional laser displacement sensors 18, 19 detect the positions P1, Q1 of these crossing points (for example a value on X-Y coordinate). In this manner, these detected position P1, Q1 of the starting end 15a is stored by the control means 27 as the detection result.

Thereafter, the circumference of the building drum 13 moves for a specified distance L by rotating the building drum 13 so that the positions P2, Q2 at the crossing points between the starting end 15a and the laser beams 22, 23 are detected and stored by the control means 27 in the same way as above when the starting end 15a reaches the rotation position K2. Thereafter, each time the circumference of the building drum 13 moves for the specified distance L and the starting end 15a reaches the rotation position K3~K7, the positions P3, Q3~P7, Q7 at the crossing points between the starting point 15a and the laser beams 22, 23 are repeatedly detected and stored by the control means 27 in the same way as above. In this manner, the detection results of detecting repeatedly the position of the starting end 15a of the band-shaped member crossing the laser beams 22, 23 each time the relative displacing distance of the two-dimensional laser displacement sensors 18, 19 reaches a constant value is input to the control means 27 and the detection results are stored.

Figure 3:
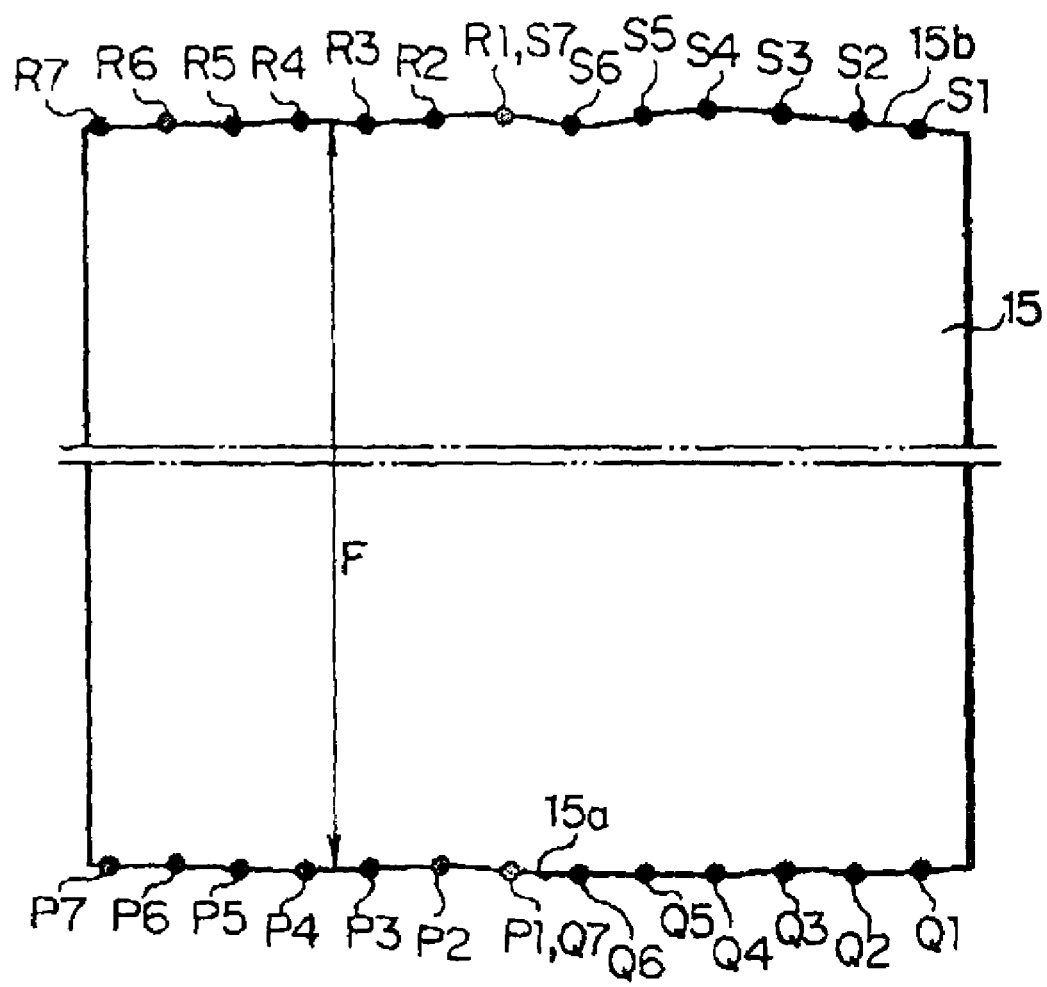
FIG. 3 is a plane view showing a obtained position information of a starting end and a terminating end.

The values of said positions P2, Q2~P7, Q7 shift such that these values are larger than that of the rotation position K1 by 1~6 times of the specified distance L with respect to the longitudinal direction of the band-shaped member 15. In order to eliminate these shifts, these values are compensated such that values of these positions P2, Q2~P7, Q7 locate on the rotation position K1. Moreover, because the starting end 15a is detected on the circumference of the building drum 13 by the two-dimensional laser displacement sensors 18, 19, the control means 27 converts the positions P1, Q1~P7, Q7 to the positions on the plane. This can prevents the occurrence of the error by the arc deformation of the band-shaped member 15. FIG. 3 shows these positions P1, Q1~P7, Q7 of the starting end 15a by the 13 points (position P1 and Q7 are the same point). These positions P1, Q1~P7, Q7 cover the whole width of the starting end 15a.

Subsequently, the control means 27 obtains the position information between said detection results (positions P1, Q1~P7, Q7) based on the plural detection results, in this embodiment 13 points of detection results (values of positions P1, Q1~P7, Q7) with the use the least-squares method to obtain the position information of the starting end 15a of the band-shaped member 15 at each width-direction position. The result is shown as a curved line connecting the positions P1, Q1~P7, Q7. This can make it possible to obtain easily and accurately the position information between detection results with the use of an approximate interpolation. For example, even if the specified distance L (sampling period) is 5 mm, it is possible to obtain the position information between the position P1, Q1~P7, Q7 within the accuracy of 0.3 mm.

Figure 4:
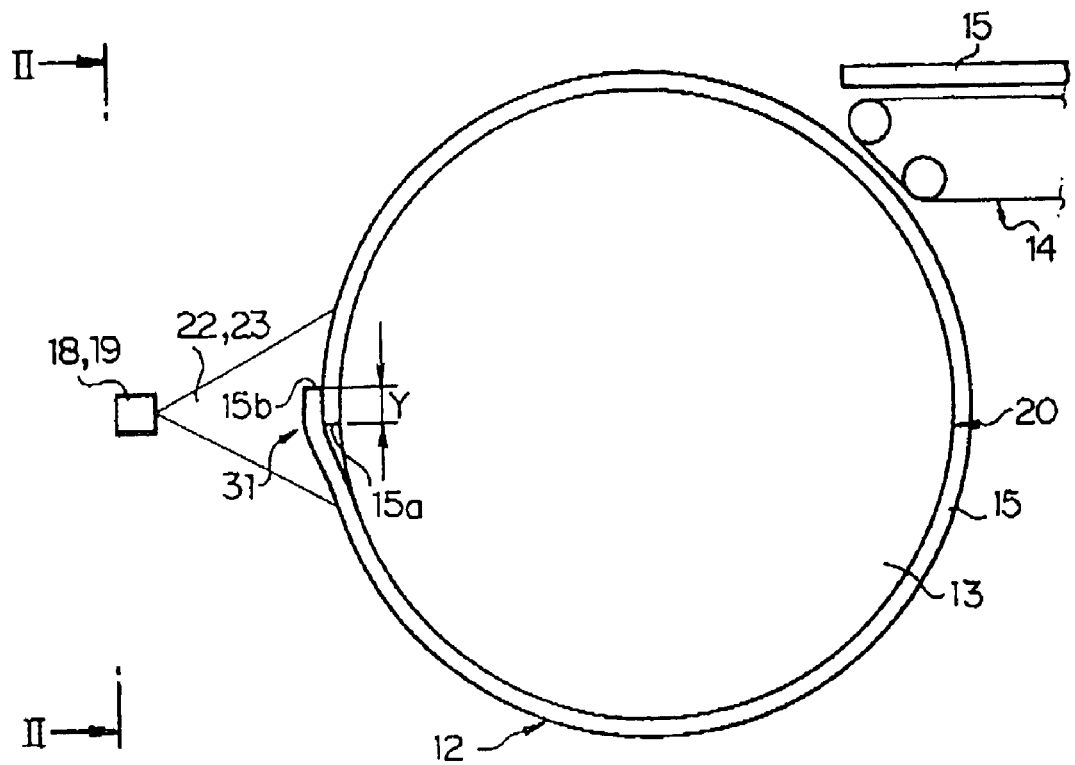
FIG. 4 is a schematic side view when detecting a terminating end of a band-shaped member.

As the building drum 13 further rotates, the band-shaped member, which is substantially the same length to a circumference length of the building drum 13, is applied on the whole circumference of the building drum 13 so that the starting end 15a and terminating end 15b of the band-shaped member 15 form a junction 31 (see FIG. 4). In the junction 31, there is an under-lap where a specified gap is formed between the starting end 15a and the terminating end 15b, a zero-lap where the starting end 15a and the terminating end 15b meets, or overlap where the starting end 15a and the terminating end 15b make the overlapping portion.

Figure 5:
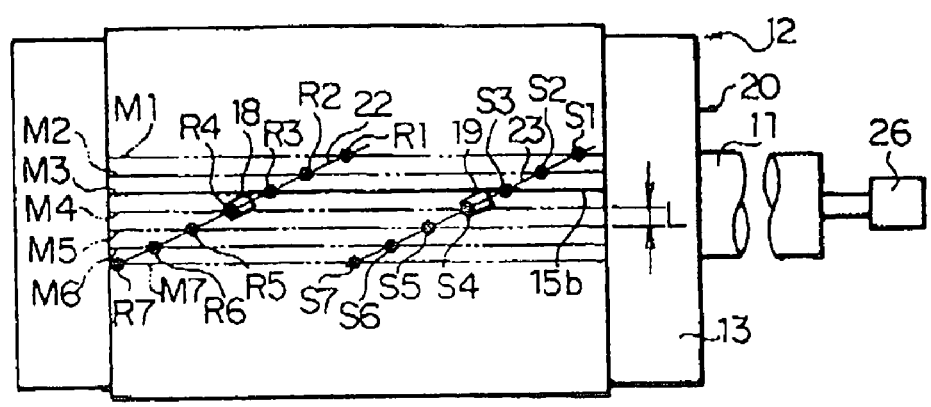
FIG. 5 is a view on arrow of II-II shown in FIG. 4.

Subsequently, as the building drum 13 further rotates, the terminating end 15b of the band-shaped member just after the applying crosses the laser beams 22, 23 from the two-dimensional laser displacement sensors 18, 19 as shown in FIGS. 4, 5. The control means 27 samples and stores the detection results of the terminating end 15b (positions R1, S1~R7, S7) from the two-dimensional laser displacement sensors 18, 19 each time the starting end 15a reaches the rotation positions M1~M7 by moving the circumference of the building drum 13 for a specified distance L. Then, based on these stored detection results, the position information at each width-direction position of the terminating end 15b is obtained in the same way as above.

Subsequently, as shown in FIG. 3, the control means 27 obtains the length F of the band-shaped member at each width-direction position, based on the position information of the starting end 15a and the terminating end 15b at each width-direction position, i.e. by subtracting value of the position information of the starting end 15a from that of the terminating end 15b at many width-direction positions. The laser beams 22, 23 emitted from the two-dimensional laser displacement sensors 18, 19 are inclined at the specified angle A with respect to the longitudinal direction of the band-shaped member 15 as described above, so that it is possible to obtain the length F at each width-direction position in a width-direction region crossing the laser beams 22, 23, in this embodiment, in a whole width of the band-shaped member 15 with high accuracy. Moreover, in this case, said effect is achieved with a simple construction where the two-dimensional laser displacement sensors 18, 19 are provided instead of a conventional laser sensor for measuring a length.

In this manner, the length F of the band-shaped member 15 is obtained. Then, the control means 27 obtains a lapping amount Y at each width-direction position of the junction 31 of the band-shaped member applied on the building drum in accordance with the difference between the length F of the band-shaped member 15 at each width-direction position and a circumference length of the building drum 13 which is measured in advance. The lapping amount Y is under, zero, or over lapping amount as above. When the lapping amount Y exceeds an acceptable value, the control means 27 outputs a signal to the warming means not shown in the figure.

It is also possible to obtain the lapping amount Y, based on a picture signal acquired by monitoring the junction 31 with a monitoring TV camera as described in Japanese Patent Application Laid-Open No. 1997-5,246, however, this makes the devices complex and expensive, and moreover this has a disadvantage that the accuracy of measuring the lapping amount Y decreases in case of overlapping because the staring end 15a is hidden by the terminating end 15b. On the other hand, by obtaining the lapping amount Y in accordance with the difference between the length F of the band-shaped member 15 at each width-direction position and a circumference length of the building drum 13 as described above, it is possible to obtain easily and certainly the lapping amount Y of the junction 31 formed by applying the band-shaped member 15 on the circumference of the building drum 13 at each width-direction position with a simple construction.

Figure 6:
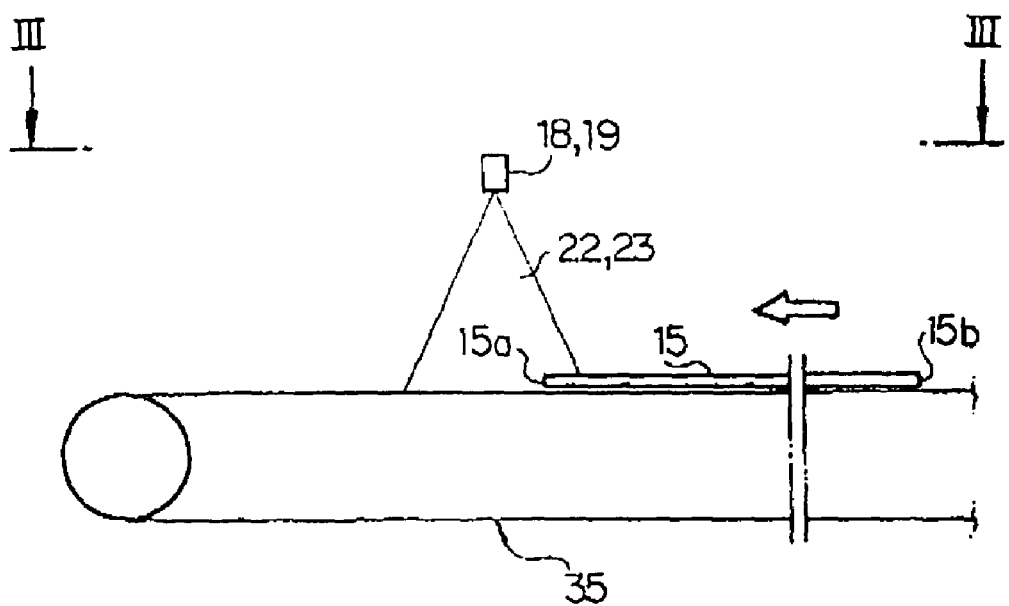
FIG. 6 is a schematic side view when detecting a starting end of a band-shaped member showing a second embodiment of the present invention.
Figure 7:
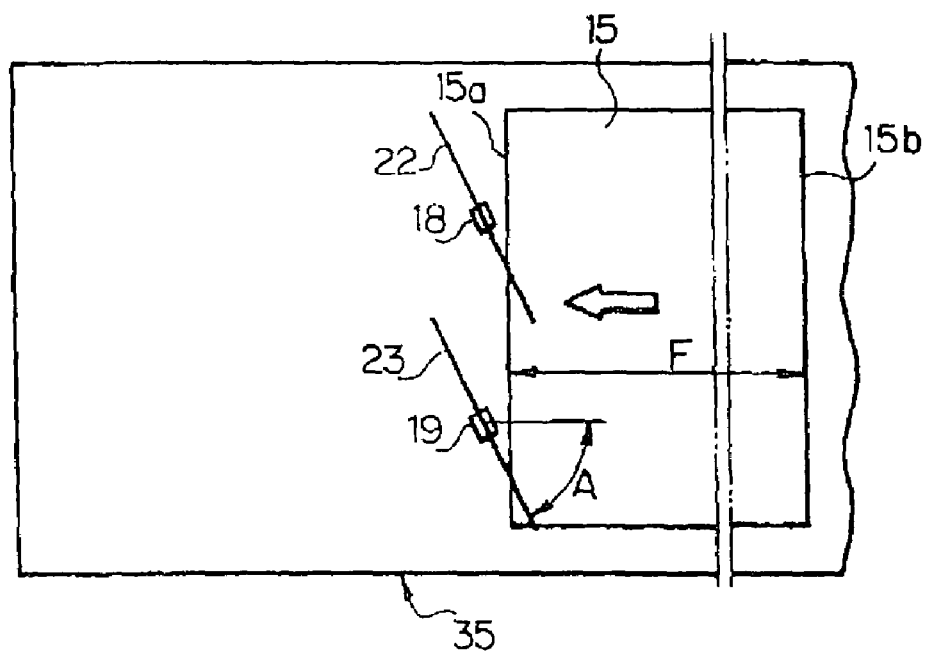
FIG. 7 is a view on arrow of III-III shown in FIG. 6.

FIGS. 6 and 7 show the second embodiment of the invention. In this embodiment, a band-shaped member 15 is carried in the longitudinal direction thereof by a belt conveyor 35 extending horizontally in a straight line while two two-dimensional laser displacement sensors 18, 19 are provided just above the belt conveyor 35 and are located apart in the width direction of the band-shaped member 15 with their laser beams 22, 23 inclined at a specified angle A with respect to the longitudinal direction of the band-shaped member 15.

In this case, the band-shaped member 15 moves relative to the two-dimensional sensors 18, 19 as the belt conveyor 35 runs. While the band-shaped member 15 moves, the starting end 15*a* and the terminating end 15*b* are detected repeatedly by the two-dimensional laser displacement sensors 18, 19. Subsequently, the position information of the starting end 15*a* and the terminating end 15*b* at each width-direction position is calculated from these detection results and a length F of the band-shaped member 15 is obtained at each width-direction position based on this position information of the starting end 15*a* and the terminating end 15*b* at each width-direction position. Thus, the length F of the band-shaped member 15 is also easily obtained when it is carried on the plane belt conveyor 35.

In addition, in this embodiment, though two two-dimensional laser displacement sensors 15, 19 arc provided, the number of the sensor provided is not limited and can be changed to suit for a range of the width-direction of the band-shaped member to measure the length thereof. Moreover, in this embodiment, though the two two-dimensional laser displacement sensors 18, 19 are fixed while the band-shaped member 15 moves relative to the two-dimensional laser displacement sensors 18, 19 by the relative moving means 20, the band-shaped member 15 can be fixed while the two-dimensional laser displacement sensors 18, 19 moves relative to the band-shaped member 15 by the relative displacing means 20 according to the present invention.

INDUSTRIAL APPLICABILITY

The invention can be applied to an industrial field where a length of a band-shaped member is measured.

The invention claimed is:

1. A method of measuring a length of a band-shaped member comprising steps of: moving two-dimensional laser displacement sensors emitting laser beams inclined at a certain angle with respect to a longitudinal direction of the band shaped member and the band-shaped member relative to each other in the longitudinal direction of the band-shaped member, detecting repeatedly each position of a starting end and a terminating end of the band-shaped member crossing the laser beams by said two-dimensional laser displacement sensors each time a relative moving distance between the two-dimensional laser displacement sensors and the band-shaped member reaches a certain value, and obtaining a position information of the starting end and the terminating end of the band-shaped member at each width-direction position from a detection result thereof; and obtaining the length of the band-shaped member at each width-direction position based on the position information of the starting end and the terminating end at each width-direction position.

2. The method according to claim 1, wherein the length of the band-shaped member at each width-direction position is obtained by detecting the positions of the starting end and the terminating end of the band-shaped member respectively just after applying the band-shaped member on a building drum when the band-shaped member and the two-dimensional laser displacement sensors move relative to each other by rotating the building drum with a circumference on which the band-shaped member is applied so that a lapping amount at each width-direction position of a junction of the band-shaped member applied on the building drum is obtained from a difference between the length of the band-shaped member at each width-direction position and a circumference length of the building drum.

3. The method according to claim 2, wherein an encoder is connected to the building drum so that each position of a starting end and a terminating end of the band-shaped member is detected repeatedly each time the relative moving distance between the two-dimensional laser displacement sensors and said band-shaped member reaches a constant value by sampling the detection result from the two-dimensional laser displacement sensors each time a pulse signal is input from said encoder.

4. The method according to claim 2, wherein the position of the starting end and the terminating end of the band-shaped member detected on the circumference of the building drum is corrected to the position on a plane.

5. The method according to claim 1, wherein, the position information between these results are obtained with the use of the least-squares method based on a plurality of detection results detected by the two-dimensional laser displacement sensor so that the position information of the starting end and the terminating end of the band-shaped member at each width-direction position is obtained.

6. An apparatus of measuring a length of a band-shaped member comprising a two-dimensional laser displacement sensors emitting laser beams inclined at a certain angle with respect to a longitudinal direction of the band shaped member; relative moving means for moving said two-dimensional laser displacement sensors and the band-shaped member relative to each other in the longitudinal direction of the band-shaped member; and control means for obtaining a position information of a starting end and a terminating end of the band-shaped member crossing the laser beams from a detection result detected repeatedly each position of the starting end and the terminating end of the band-shaped member when the detection result is input from the two-dimensional laser displacement sensors each time a relative moving distance obtained from said relative moving means reaches a certain value and obtaining the length of the band-shaped member at each width-direction position based on the position information of the starting end and the terminating end at each width-direction position.

* * * * *